United States Patent
Liu et al.

(10) Patent No.: US 9,144,783 B2
(45) Date of Patent: Sep. 29, 2015

(54) SUPER LOW PRESSURE DROP PACKING SHEET WITH DIVERSION WINDOWS AND ITS STRUCTURED PACKING

(75) Inventors: Chunjiang Liu, Tianjin (CN); Huidian Ding, Tianjin (CN); Kai Guo, Tianjin (CN); Ting Zhang, Tianjin (CN); Xigang Yuan, Tianjin (CN); Long He, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 13/813,157

(22) PCT Filed: Aug. 31, 2012

(86) PCT No.: PCT/CN2012/080816
§ 371 (c)(1),
(2), (4) Date: Jan. 29, 2013

(87) PCT Pub. No.: WO2014/015548
PCT Pub. Date: Jan. 30, 2014

(65) Prior Publication Data
US 2015/0123296 A1    May 7, 2015

(30) Foreign Application Priority Data
Jul. 24, 2012  (CN) .......................... 2012 1 0258581

(51) Int. Cl.
*B01F 3/04*    (2006.01)
*B01J 19/32*   (2006.01)

(52) U.S. Cl.
CPC .......... *B01J 19/32* (2013.01); *B01J 2219/3221* (2013.01); *B01J 2219/32241* (2013.01);
(Continued)

(58) Field of Classification Search
CPC . B01F 5/0643; B01J 19/32; B01J 2219/3221; B01J 2219/32241; B01J 2219/32408; B01J 2219/32425; B01J 2219/32433; B01J 2219/32483; F28F 25/087
USPC ................................ 261/112.2, 113, DIG. 72
See application file for complete search history.

(56) References Cited

U.S. PATENT DOCUMENTS

3,158,527 A * 11/1964 Faccin et al. ................... 428/181
3,830,684 A *  8/1974 Hamon ....................... 261/112.2
(Continued)

*Primary Examiner* — Charles Bushey
*Assistant Examiner* — Scott Bushey
(74) *Attorney, Agent, or Firm* — George G. Wang; Bei & Ocean (57) ABSTRACT

A low pressure drop structured packing sheet with diversion windows, which are formed on both crests and troughs. When in the expanded state where the diversion window and packing sheet are flat on the same plane, the diversion window has an opening and a fan-shaped portion, with the area of the opening being 0%-1000% of that of the fan-shaped portion. Two side intersection lines between the fan-shaped portion and packing sheet is symmetrical with respect to a central folding line which divides the fan-shaped portion into a left part and a right part. The two side intersection lines intercept to each other with an angel of about 10°-170°. When in the operating state where the diversion window and packing sheet are partially folded towards opposite directions, the fluid at the trough flows to a crest of the other side of the packing sheet with the help of diversion windows, thus increasing the area of vapor-liquid mass transfer. Additionally, when liquid goes across the diversion window, liquid at the bottom of the layer flow becomes the liquid on the liquid film, hence effectively facilitating update of the liquid film and turbulence, increasing mixture between the liquid and vapor, and improving rate of the mass transfer between vapor and liquid.

6 Claims, 6 Drawing Sheets

(52) U.S. Cl.
CPC .................. *B01J2219/32408* (2013.01); *B01J 2219/32425* (2013.01); *B01J 2219/32433* (2013.01); *B01J 2219/32483* (2013.01)

(56) References Cited

U.S. PATENT DOCUMENTS

| | | | | |
|---|---|---|---|---|
| 4,670,196 A | * | 6/1987 | Hsia | 261/112.2 |
| 4,676,934 A | * | 6/1987 | Seah | 261/112.2 |
| 4,710,326 A | * | 12/1987 | Seah | 261/112.2 |
| 4,740,334 A | * | 4/1988 | Rukovena, Jr. | 261/112.2 |
| 5,958,306 A | * | 9/1999 | Curtis | 261/30 |
| 6,277,340 B1 | * | 8/2001 | Paikert et al. | 422/211 |
| 6,409,378 B1 | * | 6/2002 | Kessler | 366/337 |
| 8,646,758 B2 | * | 2/2014 | Raynal et al. | 261/112.2 |

\* cited by examiner

SUPER LOW PRESSURE DROP PACKING SHEET WITH DIVERSION WINDOWS AND ITS STRUCTURED PACKING

CROSS-REFERENCE TO RELATED APPLICATIONS

This application claims priority from PCT Application No. PCT/CN2012/080816, filed Aug. 31, 2012 and CN Application No. 201210258581.X, filed Jul. 24, 2012, the contents of which are incorporated herein in the entirety by reference.

FIELD OF THE INVENTION

The present invention relates to a structured packing used in chemical vapor-liquid mass transfer process, particularly, to a super low pressure drop packing sheet with diversion windows and its structured packing.

BACKGROUND OF THE INVENTION

When corrugated packing sheets are used in operations such as rectification, absorption, extraction and the like, gas rises through corrugated channels, while liquid flows downwardly through surfaces of the packing sheets and forms films thereon, thereby mass transfer is completed by counterflow contact between gas and liquid. The corrugated packing sheets have their own crests and troughs and, liquid flows downwardly mainly along the troughs. By this way, thick films are formed on the troughs and, the crests are in an exposed state, thus resulting in un-uniform distribution of liquid in column. When liquid is presented in troughs, then entire liquid channels inside the column will be kept unchanged for a long time, hence leading to unfavorable influence on vapor-liquid mass transfer and adversely influencing separation effects of the column.

To overcome the above-mentioned problems and improve separation efficiency of the corrugated packing sheet, the present laboratory (Tianjin Branch of State Key Laboratory of Chemical Engineering) firstly developed a "structured packing sheet with diversion windows and its structured packing (Chinese Patent Application No. 200810151274.5 has been filed for the subject matter)". In this technical scheme, diversion windows are formed in both crests and troughs of the corrugated packing and, the directions of the diversion windows are opposite to the crests or troughs. When liquid flows downwardly, liquid at the troughs flows around the diversion windows and finally arrives at the back portion of the packing. So, the flow state can be reformed, which makes the vapor-liquid mass transfer more effective. To obtain better separation effects and lower the pressure drop, further improvements are made to the packing with diversion windows by the present laboratory. For example, in Chinese Patent Application No. 200910068166.6, square grooves are defined in the packing sheet. In Utility Model No. 200920307714.1, cosine flow-conducting baffles are added. In Chinese Patent Application No. 201010530832.6, both perforations and windows are formed. In Chinese Patent Application No. 201010577155.3, eccentric windows are formed. All above-mentioned novel packings have their individual features.

SUMMARY OF THE INVENTION

The object of the present invention is to provide an improved structured packing with diversion windows which has better separation effects and lower pressure drop than prior art packing such as "structured packing sheet with diversion windows and its structured packing".

The present invention is summarized as follows.

Figure 10:
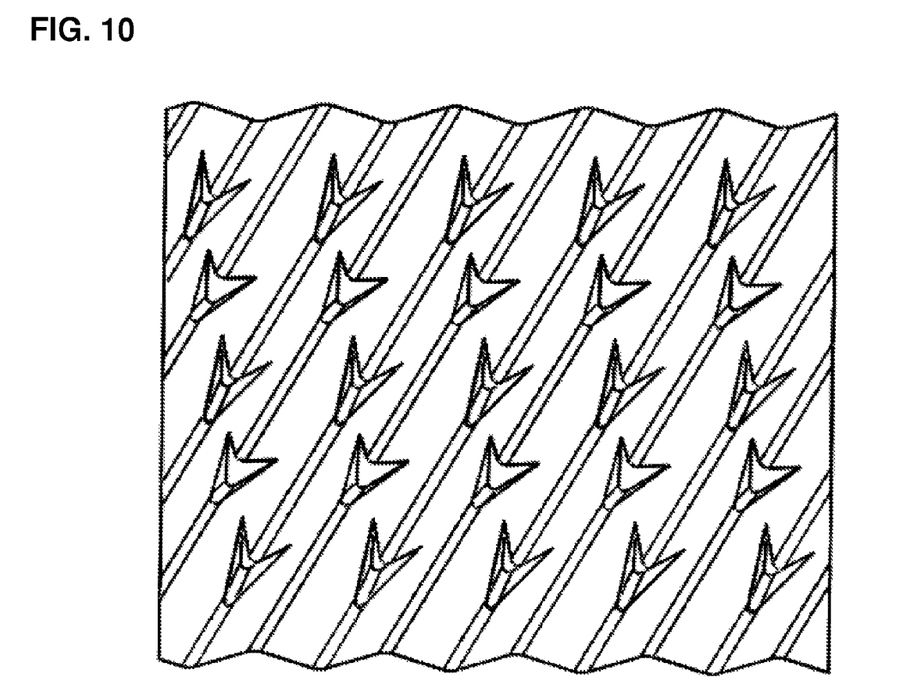
FIG. 10 illustrates a super low pressure drop structured packing sheet with diversion windows.

As shown in FIG. 10, a super low pressure drop structured packing sheet with diversion windows is provided which have diversion windows formed on both of the crests and troughs.

a. When the diversion window and packing sheet are expanded horizontally, the diversion window might include an opening 1 and a fan-shaped portion 2. The area of the opening 1 is 0%-1000% of that of the fan-shaped portion 2. When the area of the opening 1 is 0, the upper side of the opening coincides with the lower side of the opening.

b. When the diversion window and packing sheet are expanded horizontally, a region is defined between the lower side and horizontal axis of the diversion window. The region below the axis is defined as positive, while the region above the axis is defined as negative. In this case, the area of the diversion window should be greater than 0.

c. When the diversion window and packing sheet are expanded horizontally, the intersection line between the fan-shaped portion and packing sheet is symmetrical. The angle α defined between the two is 10°-170°. The horizontal width h of the diversion window is 10%-190% of the width L of the corrugated packing sheet.

d. The side lines of the diversion window and fan-shaped portion may be straight line, curved line or any irregular line.

e. A vertical axis of the diversion windows is bent oppositely towards the axis of the fan-shaped portion so as to form a packing sheet with diversion window. The angle $\beta 1$ between the left fan-shaped portion and left packing sheet 3 ranges from 10° to 170°. The angle $\beta 2$ between the right fan-shaped portion and right packing sheet 4 ranges from 10° to 170°. The angle $\beta 3$ between the left and right fan-shaped portions also ranges from 10° to 170°.

The diversion window of the packing sheet has a horizontal width of 1 mm-50 mm and vertical height of 1 mm-100 mm. The distance between the centers of the flow-conducting windows of the crest and trough of the corrugation of the packing sheet ranges from 2 mm-100 mm.

The structured packing according to the present invention is a cylinder made up of 5-100 packing sheets which are located vertically. Two adjacent packing sheets are symmetrical about the column axis and an angle of 15°-75° is defined between the two adjacent packing sheets. When an array of packings is placed into the column, the upper and lower packing trays are installed spiral with an inclination angle of 15°-90°.

The projection area of the diversion window thus made at vertical direction is significantly smaller than that of a prior art window. When the vapor stream flows upwardly through the corrugated packing, the area occupied by the diversion window is reduced, and resistance to ascending vapor phase is decreased, thus greatly reducing pressure drop of the packing layer. In addition, all advantages of a prior art packing with diversion windows are also obtained.

The packing material may be metal, plastic, ceramic, graphite and so on. When stainless steel, aluminum and titanium are used for fabrication purpose, the diversion windows may be formed directly by cutting and bending process due to good flexibility of the material used. Plastic material such as PP, PVC, PTFE and ceramic material such as carborundum and graphite might be molded and then formed.

The present invention includes all advantages of the prior art structured packing with diversion windows. When liquid film flows downwardly along the trough and passes through the diversion windows, the flowing state of the liquid film begins to change. The fluid at the trough flows to a crest of the other side of the packing sheet with the help of diversion windows, thus increasing the area of vapor-liquid mass transfer. Additionally, when liquid goes across the diversion window, liquid at the bottom of the layer flow becomes the liquid on the liquid film, hence effectively facilitating update of the liquid film and turbulence, increasing mixture between the liquid and vapor, and improving rate of the mass transfer between vapor and liquid. With the help of the flow-conducting diversion window, mixture of the vapor at radial direction is more sufficient, and mixture of the vapor and liquid is more uniform.

Furthermore, as the projection area of the window at vertical direction is substantially smaller than that of the prior art diversion window, resistance to rising gas is reduced and lower pressure drop is resulted.

In the above drawings, reference numeral 1 represents diversion window, 2 represents fan-shaped portion, 3 denotes left packing sheet, 4 denotes right packing sheet, a is the angle between the fan-shaped portion and packing sheet, β1 is the angle between the left fan-shaped portion and left packing sheet, β2 is the angle between the right fan-shaped portion and right packing sheet, while β3 is the angle between the left and right fan-shaped portions.

DETAILED DESCRIPTION OF PARTICULAR EMBODIMENTS OF THE INVENTION

Various embodiments of the invention will be demonstrated below with the drawings.

Figure 1:
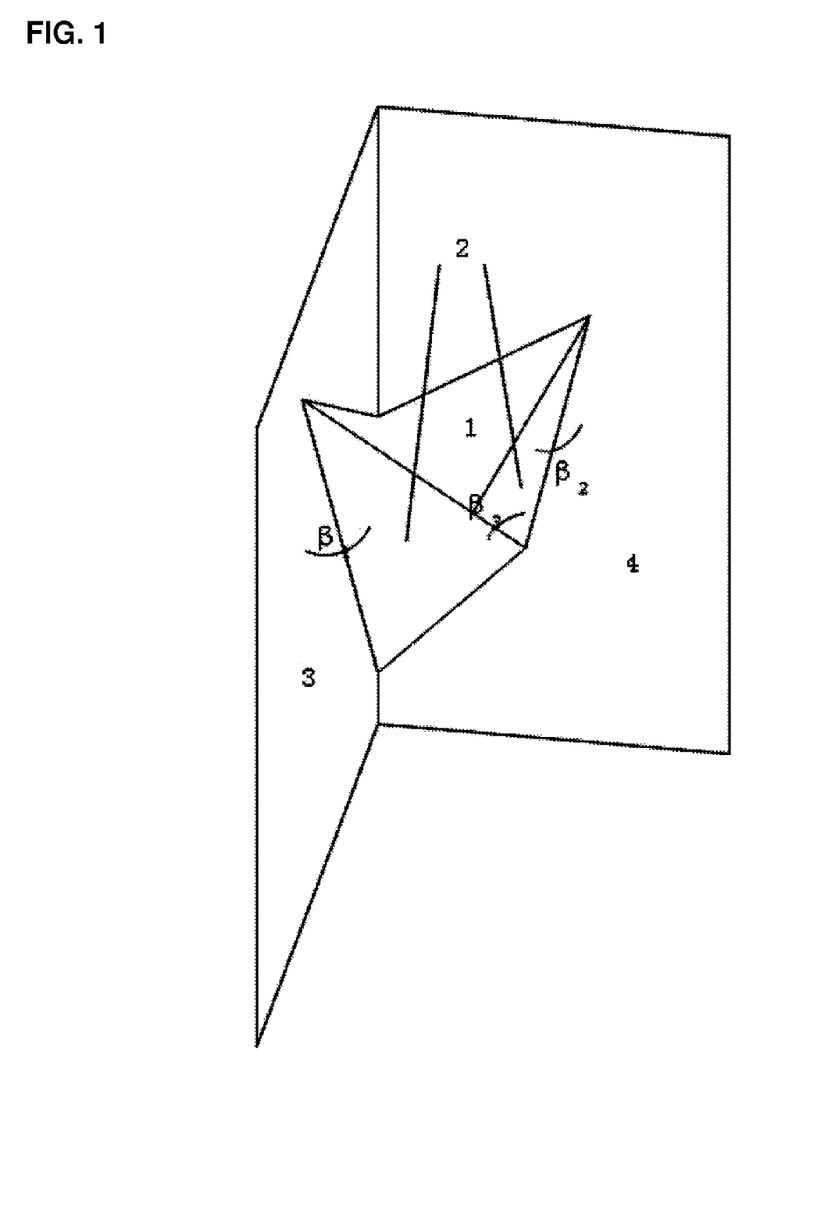
FIG. 1 is a perspective view of a diversion window of a packing.
Figure 2:
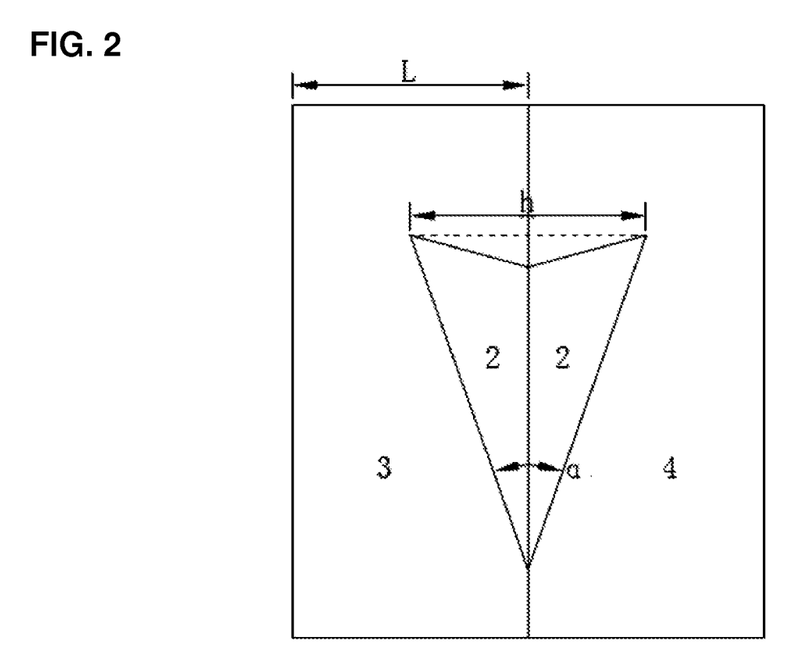
FIG. 2 is a schematic view showing a straight line type of diversion window side line when a diversion window is expanded horizontally.
Figure 3:
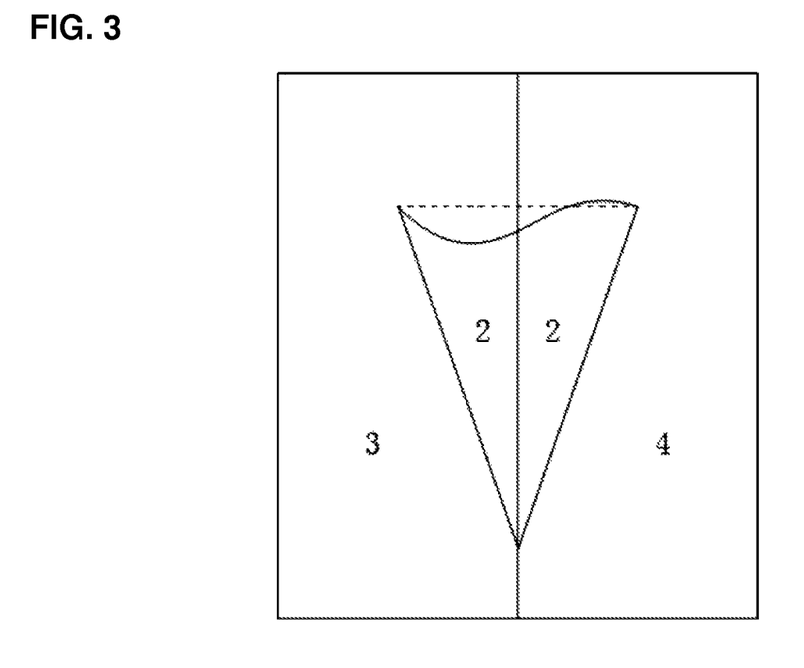
FIG. 3 is a schematic view showing a curved line type of diversion window side line when a diversion window is expanded horizontally.
Figure 4:
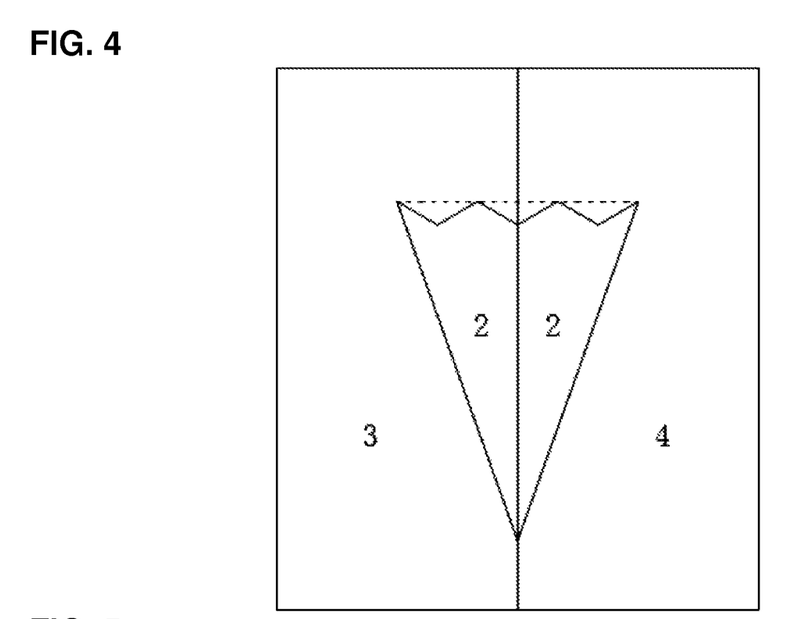
FIG. 4 is a schematic view showing a folded line type of diversion window side line when a diversion window is expanded horizontally.
Figure 5:
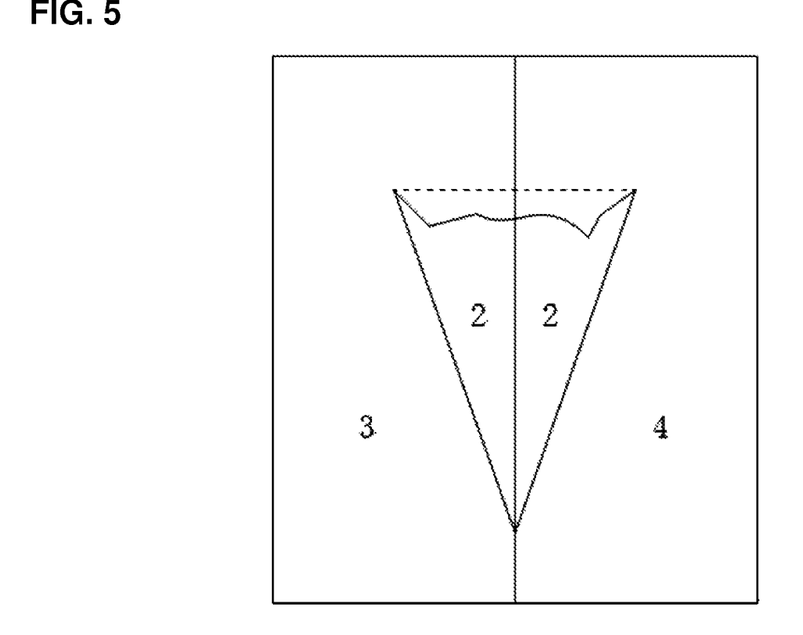
FIG. 5 is a schematic view showing an irregular line type of diversion window side line when a diversion window is expanded horizontally.
Figure 6:
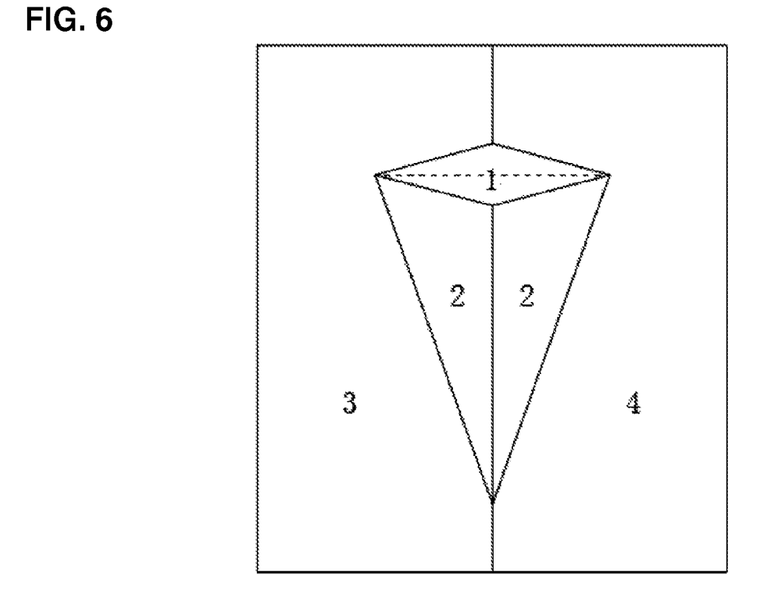
FIG. 6 shows that the side line of the diversion window is straight line and the area of the diversion window is 0.
Figure 7:
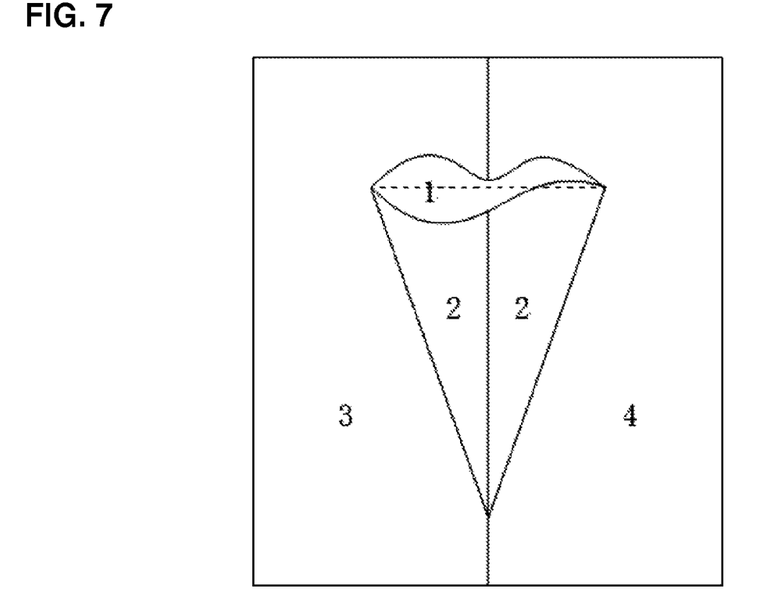
FIG. 7 shows that the side line of the diversion window is curved line and the area of the diversion window is 0.
Figure 8:
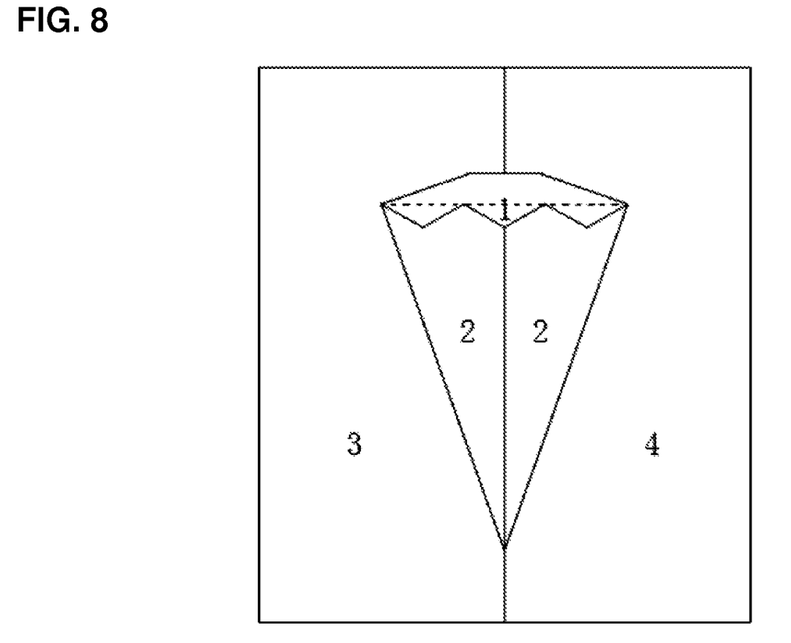
FIG. 8 shows that the side line of the diversion window is folded line and the area of the diversion window is 0.
Figure 9:
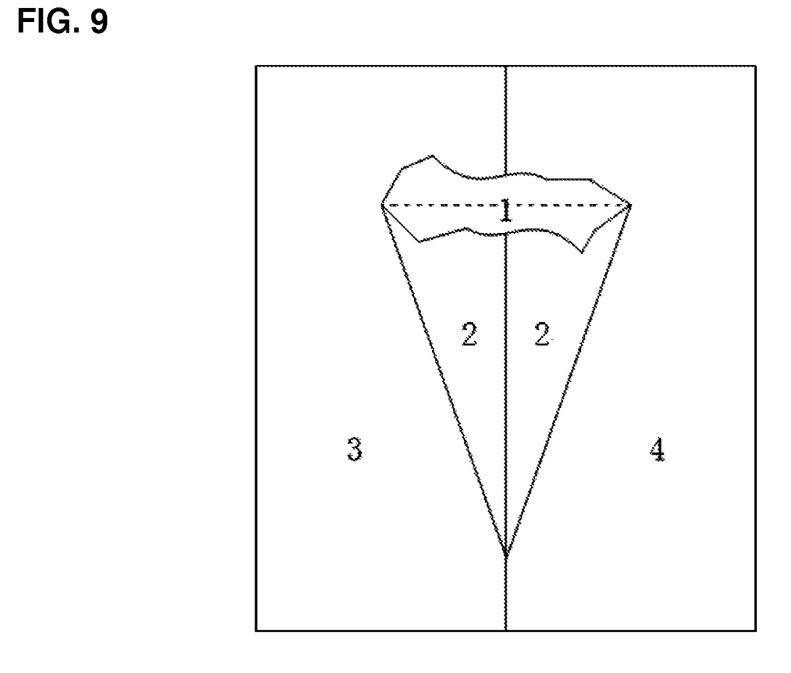
FIG. 9 shows that the side line of the diversion window is irregular line and the area of the diversion window is 0.

As shown in FIGS. 2-5, the area of the diversion window is larger than 0. The shape and dimension of the diversion window is determined by the side lines of the diversion window. In FIG. 3, from the region defined between the lower side of the diversion window and horizontal axis of the diversion window, it is seen that the area below the horizontal axis is larger than that above the same axis. The vertical projection area of the diversion window is smaller than a prior art packing with diversion windows and accordingly, the gas pressure drop is decreased. As shown in FIGS. 6-9, the area of the diversion window is 0. At this time, the upper side coincides with the lower side of the window.

FIGS. 2-9 show schematic view of horizontally expanded packing sheet. When the packing sheet is in practical use, the vertical axis of the diversion window and axis of the fan-shaped portion is bent against each other such that a super low pressure drop packing with diversion windows is formed.

When packing sheets are used to make the entire packing, vapor and liquid turbulence happens around the diversion windows, and update of the liquid film is expedited, thus assisting in vapor-liquid mass transfer. When the vapor rises along the corrugations, as the area of the diversion window at the channel is reduced, resistance to flowing gas is decreased. In other words, the vapor channel is increased and as a result, vapor stream can flow more easily. The pressure drop of the packing layer is also reduced.

Applicable Embodiment 1

The diversion window area of the packing sheet is 0, the side lines of the diversion window and fan-shaped portion are straight lines, the angle between the fan-shaped portion and packing sheet is 30°, the angle between the fan-shaped portion and packing sheet is 90°, the horizontal width of the diversion window is 5 mm, the vertical height of the diversion window is 10 mm, and the distance between the centers of the flow-conducting diversion windows of the crest and trough of the corrugated packing sheet is 20 mm. The corrugated flow-conducting metal structured packing thus made is consisted of 26 packing sheets. The inclination angle of the corrugation is 30°. The upper and lower packing trays are installed with a rotation angle of 90°. This applicable embodiment is used to separate Trichlorosilane. The pressure at top portion of the column is 1.7 atm. Experimental results show that separation efficiency is 5.3% higher than a prior art structured packing, and 3.7% higher than prior art structured packing with diversion windows. In addition, the pressure drop of the packing layer is 19.5% lower than prior art structured packing, and is 11.7% lower than prior art structured packing with diversion windows.

Applicable Embodiment 2

The area of the diversion window of the packing sheet is 103% of area of the fan-shaped portion. The lines of the diversion window are irregular lines. The intersection line between the fan-shaped portion and packing sheet is curved line and, an angle of 10° is defined between the two parts. The angle between the fan-shaped portion and packing sheet is 60°. The horizontal width of the diversion window is 7 mm, while vertical height thereof is 16 mm. the distance between the centers of the diversion windows of the crest and trough of the corrugated packing sheet is 28 mm. the structured packing with diversion window thus obtained is made up of 50 packing sheets. The inclination angle of the corrugations is 45°. The upper and lower packing trays are mounted with a rotation angle of 60°. This applicable embodiment is used for separation alcohol from water. Experimental results show that separation efficiency is 8.9% higher than a prior art structured packing, and 2.3% higher than prior art structured packing with diversion windows. In addition, the pressure drop of the packing layer is 16.1% lower than prior art structured packing, and is 9.3% lower than prior art structured packing with diversion windows.

Applicable Embodiment 3

The area of the diversion window of the packing sheet is 10 times of that of the fan-shaped portion. The lines of the diversion window are folded lines. The intersection line between the fan-shaped portion and packing sheet is folded line and, an angle of 170° is defined between the two parts. The horizontal width of the window is 1 mm, while vertical height thereof is 1 mm. The distance between the centers of the diversion windows of the crest and trough of the corrugated packing sheet is 2 mm. The ceramic structured packing with diversion windows thus obtained is made up of 5 packing sheets. The inclination angle of the corrugations is 15°. The upper and lower packing trays are mounted with a rotation angle of 15°. This applicable embodiment is used for atmosphere separation of methanol-ethanol. Experimental results show that separation efficiency is 7.7% higher than a prior art structured packing, and 4.1% higher than prior art structured packing with diversion windows. In addition, the pressure drop of the packing layer is 7.0% lower than prior art structured packing, and is 5.9% lower than prior art structured packing with diversion windows.

Applicable Embodiment 4

The area of the diversion window of the packing sheet is 350% of the area of fan-shaped portion. The lines of the diversion window are curved lines. The intersection line between the fan-shaped portion and packing sheet is irregular line and, an angle of 10° is defined between the two parts. The angle between the fan-shaped portion and packing sheet is 10°. The horizontal width of the diversion window is 50 mm, while vertical height thereof is 100 mm. The distance between the centers of the diversion windows of the crest and trough of the corrugated packing sheet is 100 mm. The ceramic structured packing with diversion windows thus obtained is made up of 100 packing sheets. The inclination angle of the corrugations is 75°. The upper and lower packing trays are mounted with a rotation angle of 45°. This applicable embodiment is used for the vacuum distillation experiment of 4-chloro-3,5-dimethyl-phenol and 3,5-dimethyl-phenol. The pressure at the top portion of the column is 0.1 atm. Experimental results show that separation efficiency is 11.3% higher than a prior art structured packing, and 6.0% higher than prior art structured packing with diversion windows. In addition, the pressure drop of the packing layer is 10.3% lower than prior art structured packing, and is 7.5% lower than prior art structured packing with diversion windows.

What is claimed is:

1. A low pressure drop structured packing sheet, comprising a plurality of diversion windows and assuming an expanded state or an operating state, wherein, in said expanded state, said diversion windows and the rest of the packing sheet are on the same plane, each of said diversion windows comprises an opening defined by an upper side and a lower side and a fan-shaped portion, said opening and said fan-shaped portion share a same width h, said fan-shaped portion has a left part and right part divided by a central folding line and being symmetric with respect to said central folding line, said left part is between said central folding line and a left side line, said right part is between said central folding line and a right side line, and said left side line and said right side line intercept with an angle $\alpha$ of 10°-170°; and in said operating state, the packing sheet is partially folded along a polarity of parallel folding lines to assume a corrugated form with a plurality of crests and troughs, and said diversion windows are also partially folded along said central folding line with an angle $\beta_3$ of 10°-170° between said left part and right part of said fan-shaped portion.

2. The packing sheet of claim 1, wherein said upper side and said lower side of said opening of said diversion window are of straight line, curved line or an irregular line.

3. The packing sheet of claim 2, wherein said width h is 10%-190% of corrugation width L of the packing sheet.

4. The packing sheet of claim 1, wherein said opening of said diversion window has a width of 1 mm-5 mm and a height of 1 mm-100 mm.

5. The packing sheet of claim 1, being made of a metal, plastic, ceramic or graphite material.

6. The packing sheet of claim 1, wherein the packing sheet is connected to 5-100 other packing sheets of the same type to form a cylinder-shaped collection.

* * * * *